United States Patent [19]

Wilchester et al.

[11] 3,990,515
[45] Nov. 9, 1976

[54] WATERFLOODING PROCESS WITH RECOVERY OF LOST SURFACTANT
[75] Inventors: Harry L. Wilchester, Dallas; Larry Smith, Richardson, both of Texas
[73] Assignee: Sun Oil Company, Dallas, Texas
[22] Filed: Dec. 24, 1974
[21] Appl. No.: 536,124
[52] U.S. Cl. ................................................ 166/273
[51] Int. Cl.² ........................................... E21B 43/16
[58] Field of Search .................. 166/273, 274, 275

[56] References Cited
UNITED STATES PATENTS

| | | | |
|---|---|---|---|
| 3,131,759 | 5/1964 | Slusser et al | 166/305 R |
| 3,302,712 | 2/1967 | Townsend et al | 166/274 |
| 3,330,344 | 7/1967 | Reisberg | 166/273 |
| 3,371,710 | 3/1968 | Harvey et al | 166/274 |
| 3,410,342 | 11/1968 | Abdo | 166/274 |
| 3,437,140 | 4/1969 | Foster et al | 166/273 |
| 3,491,834 | 1/1970 | Ahearn et al | 166/273 |
| 3,500,920 | 3/1970 | Raifsnider | 166/273 |
| 3,637,017 | 1/1972 | Gale et al | 166/273 |
| 3,707,189 | 12/1972 | Knight | 166/273 |
| 3,799,264 | 3/1974 | Cardenas et al | 166/275 |
| 3,811,504 | 5/1974 | Flournoy et al | 166/273 |
| 3,811,505 | 5/1974 | Flournoy et al | 166/274 |
| 3,811,507 | 5/1974 | Flournoy et al | 166/273 |
| 3,827,497 | 8/1974 | Dycus et al | 166/274 |
| 3,858,656 | 1/1975 | Flournoy et al | 166/273 |

*Primary Examiner*—Ernest R. Purser
*Assistant Examiner*—Jack E. Ebel
*Attorney, Agent, or Firm*—J. Edward Hess; Donald R. Johnson; Stanford M. Back

[57] ABSTRACT

In waterflooding operations loss of surfactant to the formation is reduced by following the surfactant injection with another surfactant injection before the flood.

4 Claims, No Drawings

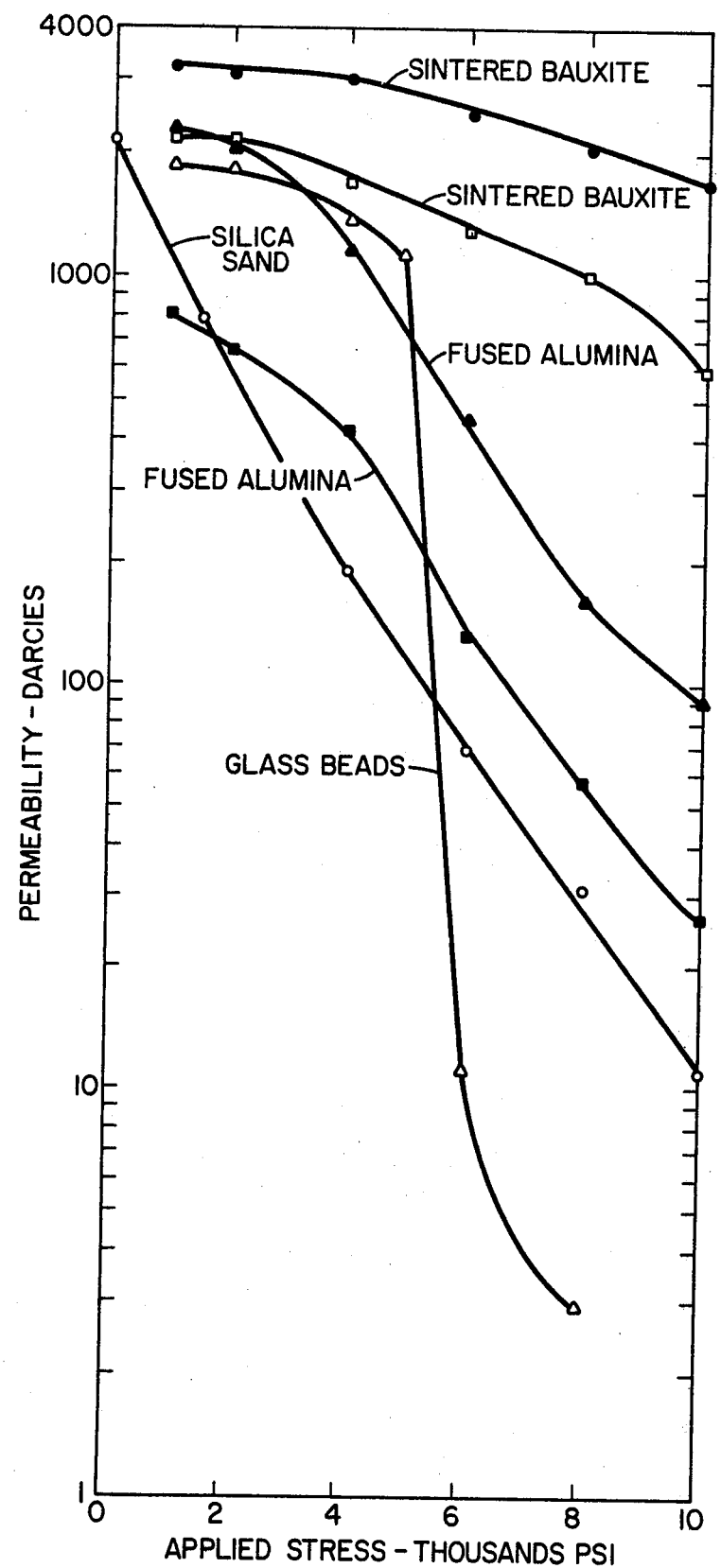

WATERFLOODING PROCESS WITH RECOVERY OF LOST SURFACTANT

BACKGROUND OF THE INVENTION

Waterflooding is a well-known technique for the secondary or tertiary recovery of oil from subterranean formations from which oil has previously been recovered by primary techniques such as pumping, natural flow and the like. In this technique, aqueous fluids are injected at one point in the reservoir at pressures sufficient to be forced out into the reservoir and toward a spaced production well or wells, thereby in effect displacing the oil from the pores of the reservoir and driving it ahead of the water front. In many areas the only economic source of water is a brine and the brine usually contains various metal ions such as calcium, magnesium and the like. As used herein brine means a sodium chloride brine. It is also common practice to add polymers to the water to improve the mobility of the water. The polymer increases the viscosity of the water and thereby improves the movement of the waterflood through the formation as a single front reducing channeling of the water through areas of the formation of greater porosity. As used herein the term water or aqueous flood includes floods in which the water contains a polymer and/or other materials.

The use of surfactants to reduce the interfacial tension between the water and the oil to be displaced from the formation is also well known and the literature is replete with different surfactants and combinations thereof useful in waterflooding processes. It is well known that the effectiveness of any given surfactant material varies considerably with such factors as temperature of the water, the amount of salt in the water, the amount and type of metal ions in the water and the like. Some typical surfactants used in waterflooding operations are described below.

U.S. Pat. No. 3,508,612 discloses the use of sulfated oxyalkylated alcohols in combination with an organic sulfonate, e.g., petroleum sulfonates.

U.S. Pat. No. 3,308,068 discloses the use of diethylene glycol mono hexyl ether (hexyl carbitol) in combination with a petroleum sulfonate.

U.S. Pat. No. 3,827,497 discloses, inter alia, the use of sulfonates such as petroleum sulfonates in combination with the sulfated alcohols disclosed in U.S. Pat. No. 3,508,612 and hexyl carbitol and further discloses the unexpected benefits obtained thereby.

Copending application Ser. No. 536,123 filed Dec. 24, 1974, discloses the use of alpha olefin sulfonates in combination with petroleum sulfonates and oxyalkylated alcohols (carbitol type materials).

Copending application Ser. No. 536,122 discloses the use of alpha olefin sulfonates in combination with oxyalkylated alkyl phenols.

U.S. Pat. Nos. 3,811,504 and 3,811,507 disclose compositions containing specific components selected from alkyl or alkylaryl sulfonates, alkylpolyethoxy sulfates, polyethoxylated alkylphenols or polyethoxylated alcohols, or in some cases salts of the foregoing.

It is apparent from the above that organic sulfonates of one type or another are very frequently included in waterflooding surfactant compositions. One problem associated with ther use is that some of the sulfonate is lost to the formation. They are adsorbed by the rock or otherwise retained by the formation and are thus not available to displace oil from the formation. This effect is much more pronounced in high salinity brines (e.g., 4–5%). Although this problem can sometimes be overcome by using additional sulfonate to compensate for that which will be lost, such a solution is usually not economical.

SUMMARY OF THE INVENTION

Loss of an organic sulfonate from the surfactant slug to the formation in waterflooding is reduced by injecting another surfactant between the slug and the water. This second surfactant, referred to as a "chaser", follows the slug and removes or chases, the lost sulfonate from the formation. The chaser-sulfonate combination is then pushed through the formation by the waterflood thereby aiding in displacing more oil.

DESCRIPTION OF THE INVENTION

The surfactant slug which is initially injected can be any of those normally employed but it will contain an oil soluble organic sulfonate surfactant.

The organic sulfonate component of the slug can be any of those widely available commercially under tradenames such as "Bryton Chemical F467," "Witco Chemical TRS–10B," "American Cyanamid Aerosol OT" and many others. They are usually, and preferably, metal salts of alkylaryl sulfonates, preferably alkali metal salts of alkylbenzene sulfonates, containing 12–30 carbon atoms, but can also be sulfocarboxylate salts, aliphatic sulfonates, petroleum sulfonates, alkylated naphthalene sulfonates and the like, the essential requirement being that it have surfactant properties. The cationic portion can be ammonium or amine as well as metal but is usually sodium. The molecular weight of this organic sulfonate surfactant is usually in the range of 300–600, more frequently 350–525, and preferably is 375–450. These materials can be prepared by well-known procedures such as those described in U.S. Pat. No. 3,308,068. They can be prepared synthetically or can be those prepared from petroleum and commonly known as petroleum sulfonates.

The sulfonate component of the surfactant slug can be a sulfonate component other than those described above, e.g., an alpha olefin sulfonate.

Alpha olefin sulfonates are available commercially under tradenames such as Stepan Chemical's "Bioterge AS-90F" and Witco Chemical's "Sulframin." They are usually made by treating a $C_8$–$C_{30}$ alpha olefin with $SO_3$, and then treating with alkali such as NaOH. The resulting product is about two-thirds isomeric olefin sulfonates, e.g.,

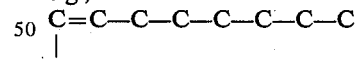

(assuming octene-1 was the original olefin) with the remaining one-third being the same as the above except there is an OH group on the chain somewhere and the double bond is eliminated. These two products together are considered the alpha olefin sulfonate. As noted the olefin has 8–30 carbon atoms but we have found 12–18 carbon atoms is best. Commercial products actually have a range of chain lengths. Other metals or ammonium or amine can be used but sodium is preferred.

The surfactant slug will normally be a multicomponent mixture of which the organic sulfonate is one component. Several beneficial surfactant compositions have been described previously but will now be described in somewhat more detail as they represent preferred embodiments of our invention.

One preferred embodiment is the organic sulfonate combined with a sulfated oxyalkylated alcohol and an oxyalkylated alcohol (otherwise known as carbitols). In this embodiment the sulfonate is preferably as described in the second paragraph under Description of the Invention and more preferably is the sodium salt of an alkylaryl sulfonate such as the petroleum sulfonates.

The sulfated oxyalkylated alcohol can be made by known procedures from oxyalkylated alcohol surfactants. The alcohol portion is usually derived from aliphatic alcohols of 8–20 carbon atoms, usually a primary alcohol, but other alcohols such as secondary aliphatics, alkyl phenols containing 5–20 carbon atoms per alkyl group and the like are suitable. The oxyalkyl portion is usually derived from ethylene oxide but other lower alkylene oxides containing 2–6 carbon atoms or mixtures thereof are suitable, e.g., propylene oxide. The oxyalkyl portion is usually polyoxyalkyl, the radical repeating itself 2–15 times, thus yielding a material of the formula $$RO-(R'O)_x-H$$

where RO— is the alcoholic portion and R'O is the oxyalkyl portion and $x$ is 2–15, preferably 2–8. The oxyalkylated alcohol may contain substituents such as hydroxyl or amine groups and the like on either the alcohol moiety or the oxyalkyl portion.

The oxyalkylated alcohol can be sulfated by conventional procedures with sulfuric acid and then neutralized to form metal, ammonium or amine salts. Such salts are widely available commercially. The sulfate can also be converted to the sulfonate by known procedures such as by reaction with sodium sulfite at elevated temperature, e.g., 170° C. for about 8 hours. The sulfonate has better hydrolytic stability and thus has better performance in high temperature reservoirs.

The oxyalkylated alcohols (which are actually polyoxyalkylated) can be made by known procedures by reacting olefin oxides with alcohols. The alcohol portion is derived from aliphatic alcohols of 4–20 carbon atoms, preferably 4–12, and is usually a primary alcohol, but other alcohols such as secondary aliphatics are suitable. The oxyalkyl portion is usually derived from ethylene oxide but other lower alkylene oxides containing 2–6 carbon atoms or mixtures thereof are suitable, e.g., propylene oxide. The oxyalkyl portion is usually polyoxyalkyl, the radical repeating itself 2–15 times, thus yielding a material of the formula $$RO-(R'O)_x-H$$

where RO— is the alcoholic portion and R'O is the oxyalkyl portion and $x$ is 2–15, preferably 2–18. The oxyalkylated alcohol may contain substituents such as hydroxyl or amine groups and the like on either the alcohol moiety or the oxyalkyl portion.

The above components are combined to make a surfactant slug useful in one embodiment of the invention. In flooding operations a surfactant-brine mixture is usually injected into the formation as a slug which is then driven through the formation as a front by additional brine which may contain a mobility improver. The slug of surfactant is usually about 10–25% of the pore volume of the formation and typically has the following amounts of the above-described ingredients:

1. Surfactant salt of organic sulfonate: 0.5–15%, preferably 2–10%.
2. Oxyalkylated alcohol: 0.25–10%, preferably 1–8%.
3. Salt of sulfated oxyalkylated alcohol: 0.25–10%, preferably 1—8%.

The above percentages are by weight with the balance being the brine portion of the slug which will usually contain 0.5–8% NaCl. The brine will often contain 50–50,000 p.p.m. polyvalent metal ions such as $Ca^{++}$ and/or $Mg^{++}$.

The ratio of components 2 and 3 above will vary. In general as the brine concentration increases the ratio of the salt of sulfated oxyalkylated alcohol to the oxyalkylated alcohol increases. This ratio also tends to increase as the metal ions in the brine increase. The total amount of components 1, 2 and 3 in the slug above will usually be in the range of 1–20%, more frequently 2–12%.

Another preferred embodiment of the present invention is items 1 and 2 in the above table (without item 3) in the amounts stated or items 1 and 3 without item 2. These compositions are substantially the same as those disclosed in the aforesaid U.S. Pat. Nos. 3,308,068 and 3,508,612 respectively.

Another preferred embodiment of our invention employs a surfactant slug of an organic sulfonate, an oxyalkylated alcohol, and an alpha olefin sulfonate. The organic sulfonate and oxyalkylated alcohol can be those described above in connection with the sulfated alcohol-containing three component slug. The alpha olefin sulfonate can also be as previously described.

The above components are combined to make a surfactant slug of the following composition:

1. Organic sulfonate surfactant: 0.25–5%, preferably 0.5–3%.
2. Oxyalkylated alcohol: 0.1–5%, preferably 0.1–2%.
3. Alpha olefin sulfonate: 0.05–5%, preferably .1–3%.

The above percentages are by weight with the balance being the brine portion of the slug which will usually contain NaCl and metal ions as previously described. The above percentages are also on an active ingredient basis as some items, e.g., items 1 and 3 above, often contain a diluent as obtained commercially.

The total amounts of all three components is most frequently in the range of 1–5%. The amount of the alpha olefin sulfonate surfactant will in most cases be less than 3% as above this level stability of the composition is sometimes reduced. Lowering the amount of alpha olefin sulfonate is in the direction of reducing recovery.

Another preferred embodiment of the surfactant slug is an oxyalkylated alkyl phenol and alpha olefin sulfonate. Optionally, an alcohol such as isopropyl alcohol may be added to reduce the viscosity of the composition.

The oxyalkylated alkyl phenol (which is actually polyoxyalkylated) component is widely available commercially but can also be made by known techniques. It has the following structure

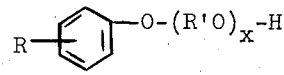

wherein R is an alkyl group containing 6–15 carbon atoms, R'O is the oxyalkyl group which usually contains 2–20 carbon atoms, and s is also 2–20. Usually R contains 6–12 carbon atoms and is preferably nonyl. Preferably, R'O is ethoxy and $x$ preferably is 6. They are available, for example, under the names "NP-60" (Retzloff Chemical) or "Igepal CA620" (GAF Corporation).

The above components are combined to make a surfactant slug as follows:

1. Oxyalkylated alkyl phenol: 0.5–7.5, preferably 1–5%.
2. Alpha olefin sulfonate: 0.5–7.5%, preferably 1–5%.

The above percentages are by weight with the balance being the brine portion of the slug which will usually be as previously described. The above percentages are also on an active ingredient basis.

The total amounts of all three components is most frequently in the range of 1–10%. The amount of the alpha olefin sulfonate surfactant is most preferably 1–3% as is the amount of the oxyalkylated alkyl phenol.

It has also been found beneficial in some cases to add isopropyl alcohol (IPA) to the composition in amounts of about 0.5–10%, preferably 1–5%. The purpose of the alcohol is to reduce the viscosity of the surfactant slug to 5–30 centipoises at the reservoir temperature. Any viscosity desired can of course be used but a slug employing the two-component surfactant composition is often too viscous so the alcohol is added to make the desired adjustment. Other alcohols such as propyl or butyl could be used instead but isopropyl is by far the cheapest.

Any of the foregoing slugs or any other slugs can be used in practicing our invention. However, as noted before, when organic sulfonate-containing slugs are employed some of the sulfonate is lost to the formation when the slug is pushed through the formation by the subsequent aqueous flood.

In order to prevent this loss we employ a chasing surfactant behind the initial slug and in front of the aqueous flood. This chaser recovers some of the lost organic sulfonate.

A number of materials are suitable as chasers but they can in general be described as brine (or water if brine is not used) soluble anionic dispersing agents for dispersing the oil-soluble sulfonate of the petroleum sulfonate type then a satisfactory chaser is one which will disperse this petroleum sulfonate in the brine to be used in the operation. Whether or not the proposed chaser will disperse it can be easily determined by vigorously mixing say one or two parts of the petroleum sulfonate with an equal amount of chaser in enough parts of brine to total 100 parts. The mixture is preferably at the reservoir temperature. If the mixture does not separate after 12–24 hours it is stable and the chaser is in fact a satisfactory dispersing agent for the material being chased.

Another characteristic of the chaser is that it is more water-soluble than the chased material. Unless this is true the chaser material will often itself be lost to the rock just as was the chased material.

A variety of chaser materials can be employed. One suitable type material is the alpha olefin sulfonates previously mentioned as a frequent component of the surfactant slug. However, if the material being chased is an alpha olefin sulfonate (AOS) also, it will be more oil-soluble than the AOS chaser. For example, in a 4% brine a $C_{16}$–$C_{18}$ AOS could be chased with a $C_{10}$–$C_{12}$ AOS. In a 1% brine a $C_{14}$–$C_{16}$ AOS could chase a $C_{20}$–$C_{22}$ AOS. The longer the carbon chain of the AOS the more oil-soluble it is and when an AOS chases an AOS there will usually be a difference of at least four in the chain length.

Another suitable type chaser is the sulfated oxyalkylated alcohols described previously.

Another suitable chaser is the anionic surfactants known as the dialkyl sulfosuccinates and which are available commercially under the "Aerosol" trademark. They can be made by known techniques and have the following structure ROOCCHSO$_3$Na
|
ROOCCH$_2$ where R is an alkyl of 2–20 carbon atoms, preferably 2–10.

R is usually eight carbon atoms in water and is usually less in saline solutions.

Other anionic surfactants which will disperse the oil-soluble sulfonate of the slug in brine can be used as chasers.

In flooding operations the surfactant slug is usually about 0.1–0.25 pore volume and the brine employed for flooding usually has a polymer or other material in it for mobility control. A mobility control agent can if desired also be included in the chaser used in our invention. If the mobility control agent in the chaser is the same as in the flood, and it usually will be, then this is equivalent to putting the chaser in the first part of the flood and such a scheme is also part of our invention. This arrangement still employs the slug-chaser-flood sequence previously described as the first part of the flood is the chaser step whereas the part of the flood not containing chaser is the flood step.

The following examples illustrate the beneficial results achieved by our invention. The procedure in these examples is as follows.

A 1" × 4" core of Berea sandstone of 20% porosity is employed. Next 0.1 PV of the surfactant slug is injected into the core. This is followed by brine (2.9% NaCl, 1200 p.p.m. $Ca^{++}$ and 64 p.p.m. $Mg^{++}$) which is continued until no more surfactant slug comes out. The brine is followed by isopropyl alcohol (IPA) which removes the "lost" surfactant which can then be determined as milliequivalents per gram of rock. Knowing the equivalent weight of the lost surfactant a loss in pounds/acre foot can be calculated (meq./gm. rock × eq. wt. × 5765 = #/acre-foot). In converting to pounds/acre foot when a slug contained two sulfonates, the calculated result will depend on which of the two sulfonates was assumed lost.

Next the above procedure is repeated except that 0.1 PV of chaser is injected immediately after the initial slug. If the chaser is effective there will be less surfactant for the IPA to pick up and the calculated pounds/acre-foot loss will be less.

EXAMPLE I

The surfactant slug consisted of the following, all per 100 ml. of the brine specified above at 160° F.

1 g. pentadecyl benzene sulfonate (Na salt) (70% active).
5 g. 30% $C_{16}$–$C_{18}$ AOS (Na salt).
1 g. IPA to reduce the viscosity.
1.5 g. 4EO–HOD (hexyl, octyl, decyl alcohol reacted with 4 ethylene oxide groups per mole of alcohol).
The loss was 7420 #/active-foot basing the loss on the pentadecyl benzene sulfonate.
When this experiment was repeated using a chaser of 2.0 ml. 40% active $C_{10}$ AOS per 100 ml. brine the loss was 820 #/acre-foot which shows the substantial reduction achieved by the chaser.

EXAMPLE II

This experiment was identical to Example I except that the surfactant slug was 2.5 g. petroleum sulfonate (Mol. wt. 425), 1.75 g. $C_{10}$ AOS and 1.0 g. 4EO–HOD per 100 ml. of brine as in Example I.

The loss without the chaser was 6102 #/acre-foot and 650 #/acre-foot (based on the petroleum sulfonate) with the chaser.

EXAMPLE III

This experiment was the same as Example I except that the chaser was 1.5 ml. 4EO-Hexanol and 5 ml. 30% $C_{16}$–$C_{18}$ AOS per 100 ml. brine. With the chaser the loss was 3485 #/acre-foot, which shows that this chaser is not as good with this slug as the chaser of Example I.

EXAMPLE IV

In this experiment the slug was 1 g. pentadecyl benzene sulfonate (Na salt), 1 g. "Neodol 25-3S" the tradename (Shell Oil Company) for Na sulfated $C_{12}$–$C_{15}$ alcohol ethoxylated with 3 ethoxy groups per molecule, and 2 g. hexyl carbitol per 100 ml of brine at 125° F. (1% NaCl, 360 p.p.m. $Ca^{++}$). The chaser was 1 ml. "Neodol 25-3S" per 100 ml. of the sand mine. The loss without the chaser was 3150 #/acre-foot whereas with the chaser the loss was only 1153 #/acre-foot (based on the pentadecyl benzene sulfonate).

EXAMPLE V

One ml. of $C_{16}$–$C_{18}$ AOS in 5% brine containing 2000 p.p.m. $Ca^{++}$ does not dissolve but yields a definite two phase system. Upon adding 0.5 ml. $C_{10}$ AOS the entire system becomes clear (a single phase). Upon adding hexyl carbitol the entire system became birefringent, characteristic of a good recovery system. This shows that the $C_{10}$ AOS can chase the $C_{16}$–$C_{18}$ AOS and that if the hexyl carbitol had been previously mixed with the $C_{10}$ AOS a good recovery system would be obtained after the $C_{16}$–$C_{18}$ AOS had been recovered, i.e., the $C_{10}$ AOS, $C_{16}$–$C_{18}$ AOS, hexyl carbitol mix is a good recovery system.

The invention claimed is:
1. In a secondary or tertiary water flooding in which a surfactant slug containing an oil-soluble alkylbenzene sulfonate which additionally contains one or more members selected from the group consisting of an alpha olefin sulfonate, a sulfated oxyalkylated alcohol, an oxyalkylated alcohol and an oxyalkylated alkyl phenol is injected into an oil-bearing formation and an aqueous fluid is then injected to move said surfactant through said formation and thereby displace oil therefrom, the improvement for reducing loss of the surfactant slug to the formation which comprises injecting into said formation, between the injection of said surfactant and said aqueous fluid, an aqueous fluid-soluble anionic dispersing agent for said oil-soluble alkylbenzene sulfonate slug, said agent being other than an alkylaryl sulfonate.

2. The process according to claim 1 wherein said dispersing agent is an alpha olefin sulfonate or a sulfated oxyalkylated alcohol.

3. Process according to claim 3 wherein said aqueous fluid contains sodium chloride.

4. Method according to claim 1 wherein said oil-soluble alkylaryl sulfonate has a molecular weight in the range of 375–450.

* * * * *